(12) United States Patent
Compton (10) Patent No.: US 6,579,584 B1
(45) Date of Patent: *Jun. 17, 2003

(54) HIGH STRENGTH FLEXIBLE FILM PACKAGE UTILIZING THIN FILM

(75) Inventor: Stephen F. Compton, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/208,900

(22) Filed: Dec. 10, 1998

(51) Int. Cl.⁷ .............................................. B29D 22/02
(52) U.S. Cl. .................... 428/35.7; 428/34.6; 428/35.2; 428/500; 428/515; 428/516; 428/517; 428/518; 428/520; 428/522; 428/523
(58) Field of Search ................................ 428/34.8, 34.9, 428/35.1, 35.2, 35.4, 35.5, 35.7, 36.5, 36.6, 36.7, 412, 474.4, 474.7, 474.9, 475.2, 475.5, 475.8, 476.1, 476.3, 476.9, 483, 500, 515, 516, 517, 518, 520, 522, 523

(56) References Cited

U.S. PATENT DOCUMENTS

| | | | |
|---|---|---|---|
| 3,383,746 A | 5/1968 | Narduzzi et al. | 29/33.5 |
| 3,552,090 A | 1/1971 | Newill | 124/6 |
| 3,628,576 A | 12/1971 | Owen | 141/65 |
| 4,064,296 A | 12/1977 | Bornstein et al. | 428/35 |
| 4,120,716 A | 10/1978 | Bonet | 156/272 |
| 4,243,463 A | 1/1981 | Gash | 156/324 |
| 4,302,565 A | 11/1981 | Goeke et al. | 526/88 |
| 4,302,566 A | 11/1981 | Karol et al. | 526/125 |
| 4,318,763 A | * 3/1982 | Bieler et al. | 156/198 |
| 4,355,076 A | 10/1982 | Gash | 428/411 |
| 4,425,268 A | 1/1984 | Cooper | 524/110 |
| 4,457,960 A | 7/1984 | Newsome | 428/35 |
| 4,539,236 A | 9/1985 | Vilutis | 428/35 |
| 4,551,380 A | 11/1985 | Schoenberg | 428/218 |
| 4,590,124 A | 5/1986 | Schoenberg | 428/339 |
| 4,640,856 A | 2/1987 | Ferguson et al. | 428/36 |
| 4,724,185 A | 2/1988 | Shah | 428/339 |
| 4,735,855 A | 4/1988 | Wofford et al. | 428/349 |
| 4,770,731 A | 9/1988 | Ferguson | 156/229 |
| 4,837,084 A | 6/1989 | Warren | 428/349 |

(List continued on next page.)

FOREIGN PATENT DOCUMENTS

| | | |
|---|---|---|
| EP | 0 236 099 A2 | 9/1987 |
| EP | 0 346 944 B1 | 12/1989 |
| EP | 0 613 772 A1 | 9/1994 |
| JP | 3097742 | 9/1989 |
| WO | 90/03414 | 4/1990 |
| WO | 93/03093 | 2/1993 |
| WO | 95/23697 | 9/1995 |
| WO | 95/32242 | 11/1995 |

OTHER PUBLICATIONS

1990 Annual Book of ASTM Standards, vol. 08.02, pp 368–371.
Valeron® Strength Films (Product Samples and Technical Data) Van Leer Flexible Packaging.
Annual Book of ASTM Standards, pp. 174–178.
J. Poly. Sci. Poly. Phys. Ed., vol. 20, p. 441 (1982).
3.0 mil bag commercialized Jun. 1997.

*Primary Examiner*—Harold Pyon
*Assistant Examiner*—Sow-Fun Hon
(74) *Attorney, Agent, or Firm*—Rupert B. Hurley, Jr.

(57) ABSTRACT

An article, such a bag, pouch, casing, or sheet formed from joined film pieces, comprises a non-crosslaminated film. The article has a parallel plate burst strength of at least 190 inches of water, with the film having a thickness of from 1 to 2.9 mils. The film comprises one or more of a wide variety of polymers, with linear low density polyethylene being a preferred polymer. The film is heat sealed to itself or another film (preferably a similar or identical film). The burst strength is surprising in view of the thin gauge of the film, and the fact that the film is not cross-laminated.

27 Claims, 3 Drawing Sheets

U.S. PATENT DOCUMENTS

| | | | | |
|---|---|---|---|---|
| 4,853,287 A | | 8/1989 | Schirmer | 428/349 |
| 4,863,769 A | | 9/1989 | Lustig et al. | 428/34.9 |
| 4,879,430 A | | 11/1989 | Hoffman | 428/35.1 |
| 4,935,089 A | | 6/1990 | Schirmer | 156/272.6 |
| 4,981,760 A | | 1/1991 | Naito et al. | 428/523 |
| 5,011,735 A | | 4/1991 | Schirmer | 428/349 |
| 5,020,922 A | | 6/1991 | Schirmer | 383/119 |
| 5,081,911 A | * | 1/1992 | Talbot | 454/370 |
| 5,206,075 A | | 4/1993 | Hodgson, Jr. | 428/216 |
| 5,213,900 A | * | 5/1993 | Friedrich | 428/474.4 |
| 5,241,031 A | | 8/1993 | Mehta | 526/348.1 |
| 5,272,236 A | | 12/1993 | Lai et al. | 526/348.5 |
| 5,278,272 A | | 1/1994 | Lai et al. | 526/348.5 |
| 5,397,613 A | | 3/1995 | Georgelos | 428/36.7 |
| 5,427,807 A | | 6/1995 | Chum et al. | 426/393 |
| 5,434,010 A | | 7/1995 | Smith et al. | 428/520 |
| 5,530,065 A | | 6/1996 | Farley et al. | 525/240 |
| 5,545,419 A | * | 8/1996 | Brady et al. | 426/129 |
| 5,568,902 A | | 10/1996 | Hurley, Jr. | 244/238 |
| 5,593,747 A | | 1/1997 | Georgelos | 428/36.7 |
| 5,604,043 A | | 2/1997 | Ahlgren | 428/518 |
| 5,629,059 A | | 5/1997 | Desai et al. | 428/34.9 |
| 5,846,620 A | * | 12/1998 | Compton | 428/35.7 |
| 5,866,214 A | * | 2/1999 | Ramesh | 428/34.8 |
| 5,895,587 A | * | 4/1999 | Sorensen | 219/121 |

* cited by examiner

HIGH STRENGTH FLEXIBLE FILM PACKAGE UTILIZING THIN FILM

FIELD OF THE INVENTION

The present invention relates to film or sheet articles which have been converted into bags, pouches, etc., which a capable of providing a high strength, high abuse package for the packaging of a wide variety of industrial and consumer products. Such packages are subjected to high levels of abuse. The present invention is particularly directed to the use of such packaging for the direct mailing of various products, especially compact disks.

BACKGROUND OF THE INVENTION

There are a wide variety of products which can benefit from being packaged in a high strength flexible film package, i.e., a flexible film package having a high tear resistance, a high burst strength, and/or other desirable characteristics which flow from the use of high strength, highly abuse-resistant packaging materials. High strength packages are resistant to puncture, tearing, failing seals, etc. Moreover such high strength flexible film packaging, due to the relatively small amount of material used in the package, can result in significantly less waste, hence less environmental impact (and easier recycling) than the more bulky alternatives such as wood crates, paper products (e.g., corrugated paper products), foams, etc. which are the most common forms of packaging where a high strength, abuse-resistant package is desired. The light weight and low bulk of such high strength flexible film packaging material also provides significant transport advantages over the more bulky packaging materials above, requiring less energy, to transport due to lighter weight, hence lower postage rates. Such packaging is also more tamper-evident and tamper-resistant than other forms of packaging, such as paper packaging. Moreover, high strength flexible film packaging products which are not reinforced with non-thermoplastic materials are more easily recycled than reinforced products, e.g., more easily than fiberglass reinforced plastic film packaging materials.

One high strength flexible film packaging material which has been in use for some time is marketed by Van Leer Flexibles, Inc. of Houston, Tex. i.e., VALERON® strength film. VALERON® strength film is made from high density oriented and cross-laminated polyethylene, and is stated as being puncture-resistant, tear-resistant, and chemical-resistant. VALERON® strength film is described as being strong, with a smooth surface. balanced tear-resistance, of uniform thickness, is printable with solvent-based and water-based inks, and is laminatable to paper, film, and other substrates. VALERON® strength film is also described as maintaining its properties in harsh environments and as having a temperature operating range of from −70° F. to over 200° F., and as being useful in the flexible packaging, shipping, construction, agricultural, photographic, and tag & label industries. VALERON® strength film is described as having much better tear resistance than single-ply film of the same overall thickness and of the same polymer which has been biaxially oriented. VALERON® strength film has also been stated to provide improvements over even other cross-laminated films because it is annealed, i.e., subjected to an elevated temperature (i.e., from 35° C. to below the lowest melting point of the thermoplastic material present, excluding any adhesive or bonding layer). The annealing process reportedly provides VALERON® strength film with a higher impact strength relative to corresponding unannealed films.

However, VALERON® strength film is an expensive product relative to other films. This expense is undoubtedly due to the costs associated with both the cross-lamination and the annealing. It would be desirable to provide high strength flexible film packaging which has performance characteristics comparable to VALERON® strength film, but which is less complex to manufacture.

SUMMARY OF THE INVENTION

The present invention is directed to a high strength flexible film package which has characteristics comparable to packages formed from the cross-laminated films discussed above, but which is substantially less complex to produce. It has surprisingly been discovered that a non-crosslaminated film having a thickness of from 1 to 2.9 mils provides a package which is highly resistant to impact and burst, i.e., has a parallel plate burst strength of at least 190 inches of water. This high burst strength is unexpected in view of the film's thin gauge, as well as it not being a cross-laminate, and even not necessarily being annealed. This thin, high strength film is simple and relatively inexpensive to produce, while providing a burst strength comparable to more complex and expensive cross-laminated, annealed packaging materials. Moreover, it has been further unexpectedly discovered that the package according to the present invention can utilize polyethylene copolymers, and hence substantially match the chemical-resistance, operating temperature range, and printability associated with cross-laminated, annealed flexible films.

As a first aspect, the present invention is directed to an article comprising a non-crosslaminated film which comprises at least one member selected from the group consisting of linear low density polyethylene, high density polyethylene, homogeneous ethylene/alpha-olefin copolymer, polycarbonate, polyester homopolymer, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/norbornene copolymer, polystyrene, and ethylene/styrene copolymer. The non-crosslaminated film is bonded to itself or a second component which in turn comprises at least one member selected from the group consisting of linear low density polyethylene, high density polyethylene, homogeneous ethylene/alpha-olefin copolymer, polycarbonate, polyester, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/propylene/diene terpolymer, ethylene/norbornene copolymer, polystyrene, and ethylene/styrene copolymer. The article has a parallel plate burst strength of at least 190 inches of water and a thickness of from about 1 mil to about 2.9 mils.

Preferably, the non-crosslaminated film is bonded to itself. Preferably, the film has a total thickness of from about 1.2 to 2.9 mils; more preferably, from about 1.2 to 2.8 mils. Preferably, the article has a parallel plate burst strength of from about 190 to 500 inches of water. The second component can be another film or any other object to which the non-crosslaminated film can be heat sealed or otherwise bonded or adhered. Although the film can be a monolayer film or a multilayer film, preferably the film is a multilayer film. Preferably, the film is a multilayer film comprising: (A) a first inner layer and a second inner layer, wherein each of the inner layers comprises at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and (B) a first outer layer and a second outer layer, wherein each of the outer layers comprises (a) at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer, as well as (b) at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and wherein at least one member selected from the group consisting of the first outer layer and the second outer layer is sealed to itself or the other outer layer. More preferably, the multilayer film has a total thickness of from about 2.3 to 2.7 mils, and wherein the article has a parallel plate burst strength of from about 300 to 500 inches of water.

Preferably, the multilayer film is heat-shrinkable. If heat-shrinkable, preferably the multilayer film is biaxially oriented and has a free shrink, at 185° F., of from about 10 to 100 percent in at least one direction, i.e., the machine direction and the transverse direction. Alternatively or preferably, the film has a free shrink at 240° F., of from about 20 to 80 percent in each of the machine and transverse directions; more preferably, from about 30 to 70 percent in each direction; still more preferably, from about 40 to 60 percent in each direction.

The film can further comprise an $O_2$-barrier layer comprising at least one member selected from the group consisting of ethylene/vinyl alcohol copolymer, polyvinyl chloride, polyvinylidene chloride, polyamide polyester, polyacrylonitrile.

Preferably, the film is irradiated to a level of from about 50–150 kGy; more preferably, from about 75 to 125 kGy; still more preferably, from about 90–110 kGy; and, yet still more preferably, to about 100 kGy.

Optionally, or alternatively, the film may further comprise a crosslinked layer comprising a polymeric crosslinking enhancer, wherein the polymeric crosslinking enhancer comprises the reaction product of a polyene monomer and a $C_3$ to $C_8$ olefinic monomer. Optionally, a third monomer, different from the $C_3$ to $C_8$ olefinic monomer, can also be included in the polymeric crosslinking enhancer. This third monomer is selected from the group consisting of olefinic monomer, styrene or a styrene derivative, cycloolefin such as norbornene, unsaturated ester such as vinyl acetate; methyl acrylate, ethyl acrylate, and butyl acrylate, acid such as acrylic acid or methacrylic acid, and acid salt. The polymeric crosslinking enhancer can optionally be blended with another polymer. Alternatively, the polymer can be used alone. More particularly, the polymeric crosslinking enhancer comprises at least one member selected from the group consisting of ethylene/propylene/ENB terpolymer, ethylene/hexene/ENB terpolymer, ethylene/octene/ENB terpolymer, ethylene/hexene/5-vinylnorbornene terpolymer, and ethylene/octene/5-vinylnorbornene terpolymer.

Preferred forms of the article include an end-seal bag, a side-seal bag, an L-seal bag, pouch, and a backseamed casing.

As a second aspect, the present invention pertains to an article comprising a first multilayer film sealed to a second multilayer film, wherein: (A) a first multilayer film comprises at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer; and (B) a second multilayer film comprises at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer ethylene/ester copolymer, ester homopolymer, ionomer, ethylene/carbon monoxide copolymer, ethylene/propylene/diene terpolymer, ethylene/norbornene copolymer, and ethylene/styrene copolymer. The first multilayer film is not a cross-laminated film and the second multilayer film is not a cross-laminated film. The first multilayer film has a thickness of from about 1 to 2.9 mils and the second multilayer film has a thickness of from about 1 to 2.9 mils. The article has a parallel plate burst strength of at least about 190 inches of water.

Preferably, the first multilayer film comprises two outer layers each of which comprises linear low density polyethylene, and two inner layers each of which comprises ethylene/vinyl acetate copolymer; and the second multilayer film comprises two outer layers each of which comprises linear low density polyethylene, and two inner layers each of which comprises ethylene/vinyl acetate copolymer. Preferably, the first multilayer film has a total thickness of from about 2.3 to 2.7 mils, the second multilayer film has a total thickness of from about 2.3 to 2.7 mils, and the article has a parallel plate burst strength of from about 300 to 500 inches of water, Preferably, the first multilayer film and the second multilayer film are identical with respect to chemical composition and thickness. Preferred articles include a pouch and a butt-sealed backseamed casing having a butt-seal tape. Optionally, the first multilayer film further comprises an $O_2$-barrier layer comprising at least one member selected from the group consisting of ethylene/vinyl alcohol copolymer, polyvinyl chloride, polyvinylidene chloride, polyamide, polyester, and polyacrylonitrile; and the second multilayer film further comprises an $O_2$-barrier layer comprising at least one member selected from the group consisting of ethylene/vinyl alcohol copolymer, polyvinyl chloride, polyvinylidene chloride, polyamide, polyester, and polyacrylonitrile. Preferably, the multilayer film is heat-shrinkable; preferably having a free shrink, at 185° F. of from about 10 to 100 percent. Preferably, the film is irradiated to a level of from about 50–150 kiloGrays.

As a third aspect, the present invention is directed to a packaged product comprising a package and a product surrounded by the package, wherein the package comprises a non-crosslaminated film comprising at least one member selected from the group consisting of linear low density polyethylene, high density polyethylene, homogeneous ethylene/alpha-olefin copolymer, polycarbonate, polyester homopolymer, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/norbornene copolymer, and ethylene/styrene copolymer. The non-crosslaminated film is sealed to itself or a second film comprising at least one member selected from the group consisting of linear low density polyethylene, high density polyethylene, homogeneous ethylene/alpha-olefin copolymer, polycarbonate, polyester, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/propylene/diene terpolymer, ethylene/norbornene copolymer, and ethylene/styrene copolymer. The article has a parallel plate burst strength of at least 190 inches of water and a thickness of from about 1 mil to about 2.9 mils. The product comprises at least one member selected from the group consisting of compact disks, records, audio cassettes, video cassettes, tool, hardware, machinery parts, appliances, marine hardware, corrodable metal products, industrial parts containing rust inhibitor, aerosol spray can, wax, powdered chemicals, liquid chemical concentrate, industrial cartridge packs, toys, bearings, drywall, concrete board, bricks, dry pet food, adhesive, caulk, plaster mix, precut unassembled wood products, coffee, hops, shrimp, peanuts, retortable pouches, viscous fluids, explosives, frozen products, ballistic cargo, textile products, furniture, cars, boats, products dangerous for children, fertilizer and grain, plants, insecticide, sand bags (for flood control), water, seeds, skis, works of art, unmilled wood (especially firewood), lumber, tires, and hemmocult specimens.

There can be just one product in the package, or a plurality of products are in the package. The packaged product can further comprise a secondary packaging component between the film and the product, wherein the secondary packaging component comprises at least one member selected from the group consisting of rigid foam, flexible foam, film bubble product, and paper. Preferably, the secondary packaging component comprises foam. The foam can either be separate from the film, i.e., non-laminated to the film, or laminated to the film. Preferably, the foam comprises polyethylene. Preferably, the foam has a thickness of from 0.05 inch to 0.5 inch, more preferably from 0.05 inch to 0.2 inch.

DETAILED DESCRIPTION OF THE INVENTION

As used herein, the phrase "lay-flat film" refers to a film that has been extruded as an annular blown film, or extruded as a tape which is cooled and then reheated to its softening temperature and oriented to form the film. The resulting thin-walled, circular film tubing is gathered by converging sets of rollers and wound up in flattened form. The phrase "lay-flat width", refers to half of the circumference of the inflated film tube.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the term "seal" refers to any seal of a first region of a film surface to a second region of a film surface, wherein the seal is formed by heating the regions to at least their respective seal initiation temperatures, i.e., a heat seal. The sealing can be performed by any one or more of a wide variety of manners. such as using a heated bar, hot air, hot wire, infrared radiation, ultrasonic sealing, radio frequency sealing, etc.

Heat sealing is the process of joining two or more thermoplastic films or sheets by heating areas in contact with each other to the temperature at which fusion occurs, usually aided by pressure. When the heat is applied by dics or rotating wheels maintained at a constant temperature, the process is called thermal sealing. In melt-bead sealing, a narrow strand of molten polymer is extruded along one surface, trailed by a wheel that presses the two surfaces together. In impulse sealing, heat is applied by resistance elements that are applied to the work when relatively cool, then are rapidly heated. Simultaneous sealing and cutting can be performed in this way. Dielectric sealing is accomplished with polar materials by inducing heat within the films by means of radio-frequency waves. When heating is performed with ultrasonic vibrations, the process is called ultrasonic sealing.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent; more preferably, from about 85 to 100 mole percent.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyacrylonitrile, etc., as known to those of skill in the art.

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. The term laminate is also inclusive of coextruded multilayer films comprising one or more tie layers.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymers" is also inclusive of random copolymers, block copolymers, and graft copolymers.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e. named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%/o) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%. i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 10° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE), all of which are well known to those of skill in the art; as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY (TM) resins, and ENGAGE (TM) resins, available from the Dow Chemical Company, of Midland, Mich.), as well as TAFMER (TM) linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (TM) resin, and TAFMER (TM) resin, this latter group of resins has a relatively large number of short branches rather than the longer branches present in LDPE and MDPE. AFFINITY (TM) resins and ENGAGE (TM) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymier comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the phrases "seal layer," "sealing layer," "heat seal layer,"and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide polyester, and polyvinyl chloride.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of die film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards,* Vol. 08.02, pp. 368–371, which is hereby incorporated, in its entirety, by reference thereto.

Although the film useful in the article of the present invention has at least 1 layer (more preferably, from 1 to 20 layers), more preferably the film has from 1 to 12 layers, still more preferably, from 1–8 layers; and, yet still more preferably, from 1–4 layers. However, so long as the multilayer film has at least 3 layers, the multilayer film can have any further number of additional layers desired, so long as the film provides the desired properties for the particular packaging operation in which the film is used, e.g., $O_2$-barrier characteristics, free shrink, shrink tension, optics, modulus, seal strength, etc. The multilayer film illustrated in FIG. 2 has four layers. However, since the middle layer is preferably formed from the collapsing of a two-layer tubing film upon itself, the middle layer is actually two distinct layers itself, so that the film, in reality, contains four layers.

Figure 1:
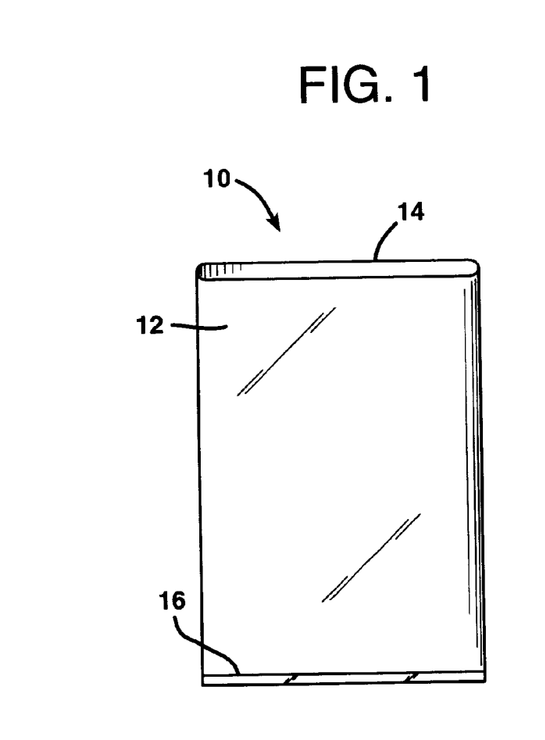
FIG. 1 illustrates a schematic view of a preferred end-seal bag according to the present invention, in a lay-flat view.

FIG. 1 is a side-view illustration of a preferred article (an end-seal bag) in accordance with the present invention. In FIG. 1, end-seal bag 10 is illustrated in lay-flat position. End-seal bag 10 is made from film 12, with end-seal bag 10 having open top 14 and end-seal 16.

Figure 2:
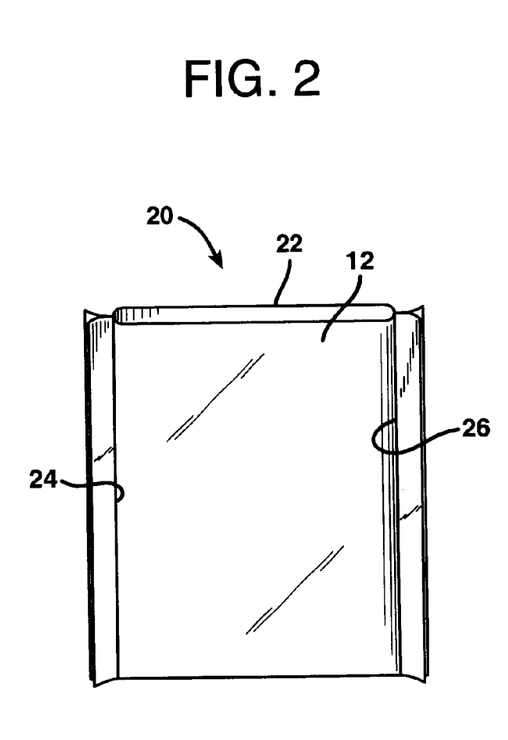
FIG. 2 illustrates a schematic view of a preferred side-seal bag according to the present invention, in a lay-flat view.

FIG. 2 is a side-view illustration of another preferred article (a side-seal bag) in accordance with the present invention. In FIG. 2, side-seal bag 20 is illustrated in lay-flat position. Side-seal bag 20 is also made from film 12, and side seal bag has open top 22, and side seals 24 and 26.

Figure 3:
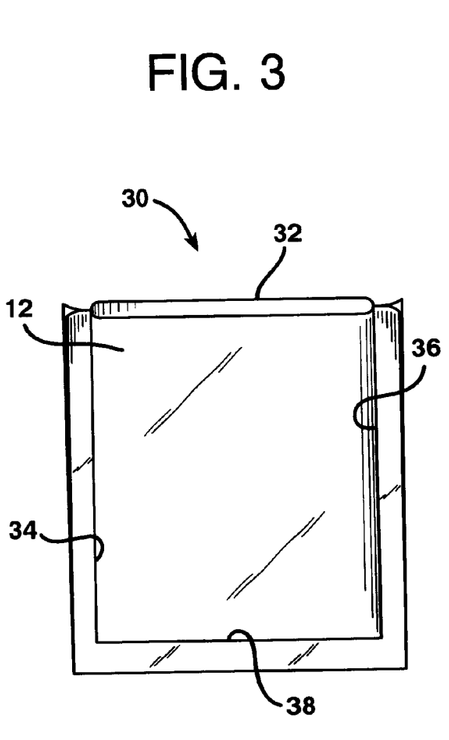
FIG. 3 illustrates a schematic view of a preferred pouch according to the present invention, in a lay-flat view.

FIG. 3 is a side-view illustration of another preferred article (a pouch) in accordance with the present invention. In FIG. 3, pouch 30 is illustrated in lay-flat position. Pouch 30 is also made from film 12, has open top 32, and side seats 34 and 36 and end seal 38.

Figure 4:
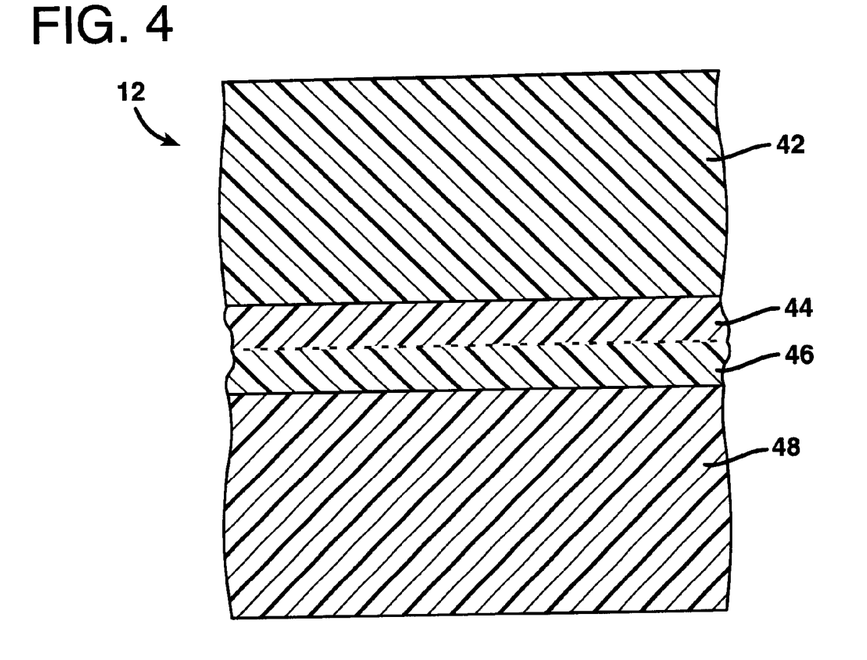
FIG. 4 illustrates a cross-sectional view of a first preferred multilayer film suitable for use in the articles illustrated in FIGS. 1–3.

FIG. 4 illustrates a cross-sectional view of preferred 4-layer film 12 for use as the stock material from which the bags of FIGS. 1 and 2, and the pouch of FIG. 3, are made. Film 12 has first layer 42, which is a first outer film layer, inner film layers 44 and 46, and second outer film layer 48. The cross-section of film 12 is preferably symmetrical, i.e., with respect to both thickness and chemical composition. The outer layers are preferably much thicker than the inner layers. Preferably, film 12 is made by collapsing a two-layer tube upon itself to result in a symmetrical 4-layer film. Since the inner film layers are actually made from the same layer of a tubular film which is collapsed the two inner film layers are, for all practical purposes, one layer. The dotted line in FIG. 4 represents the junction of the inner layer of the tube which is joined to itself.

Figure 5:
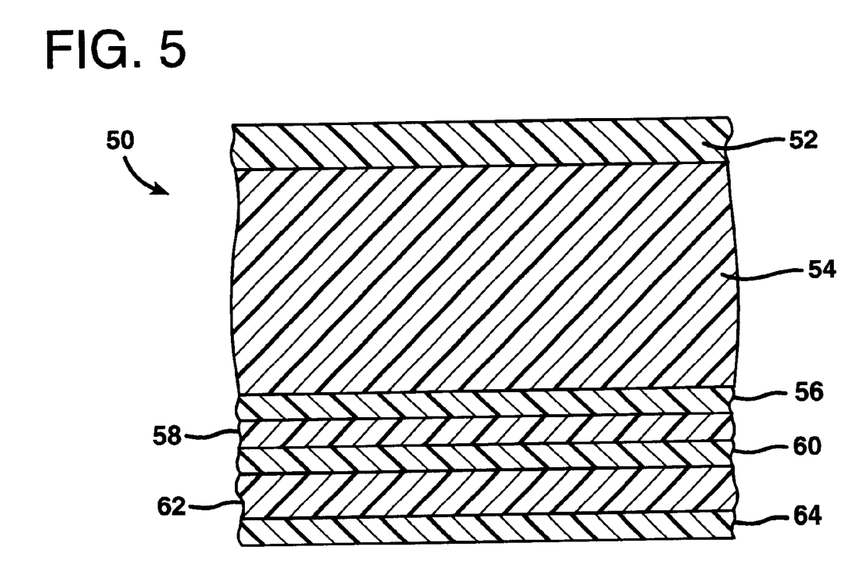
FIG. 5 illustrates a cross-sectional view of a second preferred multilayer film suitable for use in the articles illustrated in FIGS. 1–3.

FIG. 5 illustrates a cross-sectional view of an alternative multilayer film 50 which can be used as stock material for preparing an article according to the present invention. Multilayer film 50 is a 7-layer film, and is described in detail as Film No. 19, below. Multilayer film 50 is composed of outer layer 52, bulk layer 54, tie layer 56, $O_2$-barrier layer 58, tie layer 60, bulk layer 62, and outer layer 64.

Figure 6:
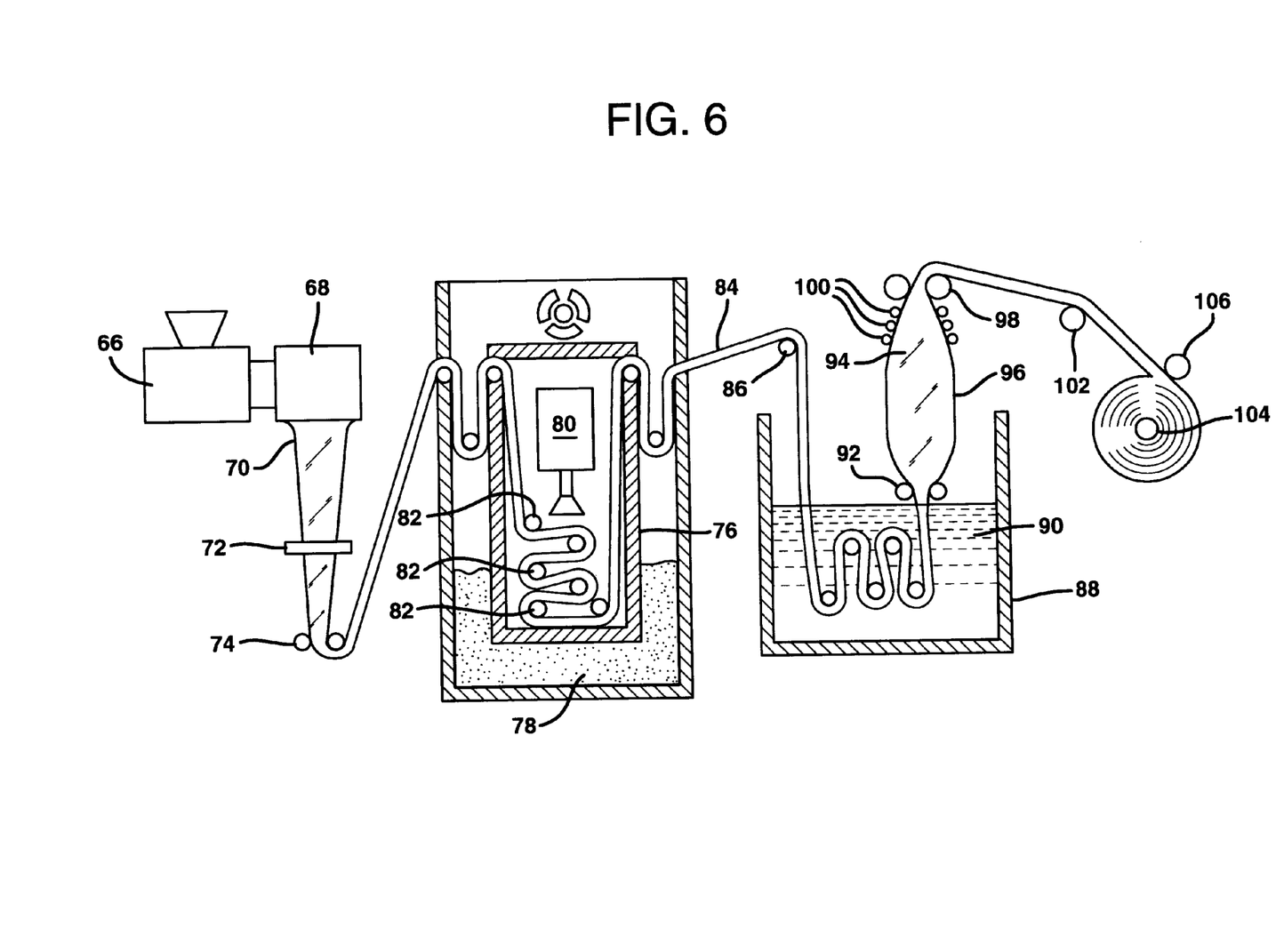
FIG. 6 illustrates a schematic view of a preferred process for making the multilayer films illustrated in FIGS. 4 and 5.

FIG. 6 illustrates a schematic of a preferred process for producing the multilayer films of FIGS. 4 and 5. In the process illustrated in FIG. 6, solid polymer beads (not illustrated) are fed to a plurality of extruders 66 (for simplicity, only one extruder is illustrated). Inside extruders 66, the polymer beads are forward, melted, and degassed, following which the resulting bubble-free melt is forwarded into die head 68, and extruded through annular die, resulting in tubing 70, which is 5–40 mils thick, more preferably 20–30 mils thick, still more preferably, about 25 mils thick.

After cooling or quenching by water spray from cooling ring 72, tubing 70 is collapsed by pinch rolls 74, and is thereafter fed through irradiation vault 76 surrounded by shielding 78, where tubing 70 is irradiated with high energy electrons (i.e., ionizing radiation) from iron core transformer accelerator 80. Tubing 70 is guided through irradiation vault 76 on rolls 82. Preferably, the irradiation of tubing 70 is at a level of from about 2 to 10 megarads (hereinafter "MR"); more preferably, from about 3.5–4 MR.

After irradiation. irradiated tubing 84 is directed over guide roll 86, after which irradiated tubing 84 passes into hot water bath tank 88 containing water 90. The now-collapsed irradiated tubing 84 is submersed in the hot water for a retention time of at least about 5 seconds, i.e., for a time period in order to bring the film up to the desired temperature, following which supplemental heating means (not illustrated) including a plurality of steam rolls around which irradiated tubing 84 is partially wound, and optional hot air blowers, elevate the temperature of irradiated tubing 84 to a desired orientation temperature of from about 240° F.–250° F. Thereafter, irradiated film 84 is directed through nip rolls 92, and bubble 94 is blown, thereby transversely stretching irradiated tubing 84 to form oriented blown tubing film 96. Furthermore, while being blown, i.e., transversely stretched, irradiated tubing 84 is drawn (i.e., in the longitudinal direction) between nip rolls 88 and nip rolls 98, as nip rolls 98 have a higher surface speed than the surface speed of nip rolls 92. As a result of the transverse stretching and longitudinal drawing, irradiated, biaxially-oriented, blown tubing film 96 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 94 is maintained between pinch rolls 92 and 98, blown tubing film 96 is collapsed by converging rolls 100, and thereafter conveyed through pinch rolls 98 and across guide roll 102, and then rolled onto wind-up roller 104. Idler roll 106 assures a good wind-up.

Various films suitable for use in the article of the present invention are illustrated by the following examples. Unless stated otherwise, all percentages, parts, etc. are by weight.

Film No. 1

A coextruded, two-ply tubular tape is cast, the tape having a thickness of about 13.9 mils, the tape having an A layer making up 85 percent of the tape thickness, and a B layer making up 15 percent of the tape thickness. The A Layer is composed of (a) 87 weight percent DOWLEX 2045 (TM) linear low density polyethylene having a density of 0.920 g/cc, obtainable from The Dow Chemical Company, of Midland, Mich. (hereinafter "LLDPE #1"), (b) 10 weight percent ELVAX 3128 (TM) ethylene/vinyl acetate copolymer having a vinyl acetate content of 10 percent, obtainable from DuPont, of Wilmington, Del. hereinafter "EVA #1", and (c) 3 weight percent TEKNOR EPE-9621 C (TM) antiblock agent, obtainable from Teknor Apex Plastics Division, of Pawtucket, R.I., hereinafter "Antiblock #1". The B Layer contains 100 weight percent EXACT SLP 4008 linear homogeneous ethylene/alpha-olefin plastomer having a density of 0.885 g/cc, obtainable from the Exxon Chemical Company, of Baytown, Tex. (hereinafter. "linear homogeneous ethylene/alpha olefin #1").

The two-ply tubing is cooled to a solid phase in a water bath and then is electronically crosslinked with a 500 Kev beam to a level of from about 2 to 10 MR. The resulting crosslinked two-ply tubing is heated by steam cans and hot air at about 210–220° F., and is subsequently oriented by being drawn and stretched 344%, in each of the machine and transverse directions, respectively, using a trapped bubble of air held between two nip rolls. After drawing, the resulting tube of hot-water-shrinkable flat film is passed through a pair of nip rolls, causing the inside B layer to bond to itself upon tube collapse, rendering a final four-ply film, with the "middle" plies being the inside B layer bonded to itself (i.e., resulting in a "4-ply" film having a thickness of 2.5 mils). That is, the orientation produces a 1.25 mil film which is collapsed and self welded to form a 2.5 mil thick structure which is capable of being delaminated to form two 1.25 mil films, or left in its self-welded state and used as a 2.5 mil film which is in the form of a collapsed tubing. The self-welded tubing has the following structure:

| A | B | B | A |
|---|---|---|---|
| Blend A | SLP 4008 | SLP 4008 | Blend A |

Table I, immediately below, includes the chemical composition and thickness of each of the layers, together with the function which the layer serves in the film.

TABLE I

| layer location / layer function | chemical identity | layer thickness (mils) |
| --- | --- | --- |
| Outside / puncture resistant | 87% LLDPE #1<br>10% EVA #1<br>3% Antiblock #1 | 1.06 |
| core / tie (actually two identical layers self-welded to one another) | Homogeneous ethylene/alpha-olefin #1 | 0.38 |
| inside / puncture -resistant | 87% LLDPE #1<br>10% EVA#1<br>3% Antiblock #1 | 1.06 |

Film No. 1 is composed of the above three layers, the middle layer being composed of the inside tube layer adhered to itself. Film No. 1 is determined to have a free shrink at 185° F. (via ASTM 2732), and an instrumented impact, as set forth below in Table II, below. Instrumented impact is measured by a procedure substantially equivalent to ASTM D 3763. ASTM D 3763 is described in the 1990 *Annual Book of ASTM Standards,* Section 8, Plastics, Vol. 08.03, pp. 174–178, which is hereby incorporated by reference thereto, in its entirety.

An alternative to Film No. 1 is a two-layer film having a thickness of about 2.25 mils, with about 85 weight percent of this film having a composition corresponding to the outside and inside layers described in Table I above, and with 15 weight percent of this film having a composition corresponding to the inner core/tie layer in Table I above. This film could be produced using a flat die, rather than a circular die.

Film No. 2

Film No. 2 is prepared by the same process employed to produce Film No. 1, with the exception that in Film No. 2, the A Layer is composed of a blend of: (a) 87 weight percent LLDPE #1, (b) 10 weight percent EXACT 3032 (TM) linear homogeneous ethylene/alpha-olefin plastomer having a density of 0.900 g/cc, also obtainable from the Exxon Chemical Company (hereinafter, "linear homogeneous ethylene/alpha-olefin copolymer #2"), and (c) 3 weight percent Antiblock #1. In Film No. 2, the B Layer remains identical to the B Layer of Film No. 1. Furthermore, as with Film No. 1, in Film No. 2 the A Layer is made up 85 percent of the tape thickness, and a B layer is made up 15 percent of the tape thickness. The Film No. 2 free shrink and instrumented impact are provided in Table III, below.

Film No. 3

Film No. 3 was prepared by the same process employed to produce Film No. 1, except that in Film No. 3, the irradiation was carried out at 3.5 to 4 MR (about half the level of the irradiation used to make all of the other films disclosed herein; this low irradiation level enhances the heat sealability of the outer film layers). The A Layer was composed of a blend of: (a) 87 weight percent LLDPE #1, (b) 10 weight percent ELVAX 3128 (TM) ethylene/vinyl acetate copolymer having a vinyl acetate content of 9 percent and a density of 0.928 g/cc, and a melt index of 2.0, obtained from the DuPont Chemical Co., of Wilmington Del. (hereinafter referred to as "EVA #2"), and (c) 3 weight percent Antiblock #1. In Film No. 3, the B Layer was composed: of 100 weight percent ELVAX 3175 (TM) ethylene/vinyl acetate copolymer having a vinyl acetate content of 28 percent and a density of 0.950 g/cc, and a melt index of 6.0, obtainable from the DuPont Chemical Co., of Wilmington, Del. Furthermore, as with Film No. 1, in Film No. 3 the A Layer made up 85 percent of the tape thickness, and a B layer made up 15 percent of the tape thickness. The Film No. 3 free shrink and instrumented impact are provided in Table III, below.

Bags were made using a standard VERTROD® sealing machine (obtained from Vertrod Corporation of Brooklyn, N.Y.). However the standard VERTROD® sealer was modified to simulate bag making conditions with a 0.0937 inch radius wire, and provided a preheating period of 0.6 second, followed by a seal period of 0.6 second, followed by a cooling time of 0.2 second, and used a pressure of about 50 psi. In the sealing of Film No. 3, the machine was set to heat the seal wire with a current at 36 volts. The sealing of the VALERON® comparative films was found to be more effective at 40 volts and 45 volts.

The Parallel Plate Burst Test was carried out by confining a 5"×13" side-seal bag (made from the material being tested), the bag being formed by sealing the material to itself using a VERTROD® sealing machine, and thereafter inflating the bag until it ruptured. The pressure level inside the bag at the point of rupture was considered to be a measure of seal quality. Results were reported in inches of water pressure (IOWP).

The parallel plate burst test was carried out on both the bags made from Film No. 3 as well as bags made from two comparative non-crosslaminated polyethylene films. The parallel plate burst test was carried out by placing a bag between parallel walls about 3–4 inches apart, with the bags thereafter being inflated until one of the side-seals failed. The failure always occurred in the region adjacent the seal. The seal itself did not fail. The amount of pressure inside the bag at the point of failure was the measure of burst strength. In the parallel plate burst test, the bags made from the film according to Film No. 3 had mean burst strengths of 334 inches of water, and were fairly consistent in strength, i.e., ranged from a low of about 305 inches of water to a high of about 430 inches of water. In contrast, two comparative non-crosslaminated polyethylene films having thicknesses of 3 and 4 mils, respectively exhibited lower parallel plate burst strength, i.e., 185 and 160 inches of water, respectively.

A WELDOTRON® Transverse Trim Seal Strength Test was also carried out. The WELDOTRON® Transverse Trim Seal Strength Test was conducted using a WELDOTRON® 6402 heat sealing apparatus. The WELDOTRON® 6402 heat sealing apparatus formed a heat seal by heating a wire which melted through the films to be heat sealed together, with the result that a heat seal was formed. More particularly, the WELDOTRON® 6402 heat sealing apparatus was operated at a tap setting of 6, and a compensator gap of about ½ inch. After the seal was formed, a 1.0 inch by approximately 4 to 5 inch sample was cut from the sealed film. As in the VERTROD® seal strength test described above, the sample cut from the sealed film had the seal transversely across the midpoint thereof. This sample was thereafter also subjected to "pulling apart" force in an INSTRON® tensile testing machine (made by the Instron Corporation of Canton. Mass.). The two pairs of jaws of the INSTRON® tensile testing machine were 2 inches apart. The higher the amount of force which was required in order to cause the film to rupture, the stronger the seal. The results of the WELDOTRON® Transverse Seal Strength Test are provided in the right-hand column of Table II, above. Surprisingly and unexpectedly, the 2.5 mil films of the bags according to the present invention, i.e., made using Film No. 3, exhibited a WELDOTRON® seal strength of 16 pounds per linear inch, versus the 4.0 and 6.0 VALERON® crosslaminated films, the seals of which exhibited a WELDOTRON® seal strength of only 9.9 and 10.2 pounds per inch, respectively. In other words, the 2.5 mil sealed films in accordance with the present invention exhibited as WELDOTRON® seal strength of about 162% and 157%, respectively, of the WELDOTRON® seal strength of the 4.0 mil and 6.0 mil VALERON® crosslaminated films. This was surprising and unexpected, for such a thin film.

Table II, below, provides additional physical properties of Film No. 3 in comparison with two other commercially available polyethylene films.

TABLE II

Physical Properties of Various Films

| Property Identity | 2.5 mil film of the invention (Film No. 3) | 3.0 mil polyethylene film (Comparative) | 4.0 mil polyethylene film (Comparative) |
|---|---|---|---|
| Tensile Strength (psi) | 12,375 MD<br>11,795 TD | 3.797 MD<br>1,703 TD | 3,188 MD<br>1,494 TD |
| Free Shrink (% at 240° F.) | 60 MD<br>61 TD | 51 MD<br>elongated in TD | 12 MD<br>elongated in TD |
| Instrumented Impact (J) | 254 | 39 | 44 |
| Parallel plate burst strength (inches of water) | 334 | 185 | 160 |
| Weldotron ® seal strength (lbs./in.) | Greater than 16 | 9 | Not measured |

MD = machine direction
TD = transverse direction

Table III, below, provides a summary of the burst test results, i.e., a comparison of the Parallel Plate Burst Strength and the Weldotron® seal strength results for seals made using Film No. 3 versus seals made using two VALERON® crosslaminated films produced in accordance with U.S. Pat. No. 4,355,076, to Duggan J. Gash, and/or U.S. Pat. No. 4,243,463, also to Duggan J. Gash.

TABLE III

| Film Identity | Film Thickness (mils) | Irradiation Level (milliamp per ft/min) | Parallel Plate Burst Strength (in H₂O) | Weldotron ® 6402 Transverse Seal Strength (lb/in) |
|---|---|---|---|---|
| Film No. 3 | 2.5 | 0.191 | 334 at 36V | 16.0 |
| VALERON ® | 4.0 | Unknown | 179 at 40V<br>155 at 45V | 9.9 |
| VALERON ® | 6.0 | Unknown | WNS at 40V<br>351 at 45V | 10.2 |

WNS = would not seal
WNC = would not cut

As is apparent from the results set forth in Table III, the Parallel Plate Burst Strength of the side-seal bag made from Film No. 3 compared favorably with the Parallel Plate Burst Strength of the side-seal bags made from die VALERON® crosslaminated film. Comparing the Parallel Plate Burst Test results for the side-seal bag made in accordance with Film No. 3 with the best Parallel Plate Burst Test results of the side-seal bags made from VALERON® crosslaminated film, it is surprising and unexpected that the 2.5 mil bags according to the present invention which were sealed at 36 volts on the VERTROD® seal machine and irradiated at 0.191 milliamp per ft-min line speed, exhibited a much higher parallel plate burst strength than 4.0 mil VALERON® crosslaminated film (i.e., 334 inches of water, vs. 179 inches of water for the 4.0 mil VALERON® crosslaminated film[1]). It is also surprising and unexpected that the 2.5 mil bag according to the present invention made from the non-crosslaminated Film No. 3 exhibited a Parallel Plate Burst Strength which was almost as high as the 6.0 mil VALERON® crosslaminated film (i.e., 334 inches of water, vs. 351 inches of water for the 6.0 mil VALERON® crosslaminated film[2]).

[1]The VALERON® 4.0 mil crosslaminated film contained a black pigment was believed to somewhat reduce the strength of this film. However, the amount of any reduction in strength was unkown.
[2]The VALERON® 6.0 mil crosslaminated film was believed to be free of pigments or other additives which would tend to reduce the film strength.

The 2.5 mil thick Film No. 3, which is suitable for use in accordance with the present invention, was delaminated to produce two films, each having a thickness of 1.25 mils, each being identical in chemical composition, thickness, etc. The tear propagation of the 1.25 mil film was compared with the tear propagation of a comparative shrink film which has been used for at least several years in the prior art. The results were as follows:

TABLE IV

| Property Identity | 1.25 mils film for use according to the present invention | 1.25 mil comparative film also containing linear low density polyethylene |
|---|---|---|
| Tear Propagation (grams) | 32 (machine direction)<br>47 (transverse direction) | 18 (machine direction)<br>5 (transverse direction) |

As can be seen in Table IV, the 1.25 mil film for use in accordance with the present invention exhibited a tear strength about twice as high as the tear strength of the comparative 1.25 mil film, which also contained linear low density polyethylene. It is believed that the 1.25 mil film of the invention exhibited a higher tear propagation due to the higher level of irradiation used in the production of the film, in combination with the racking ratios used in the making of the film.

Film Nos. 4–19, described below, exemplify other films useful in the article of the present invention.

Film No. 4

Film No. 4 is prepared by the same process employed to produce Film No. 1, except that in Film No. 4, the A Layer is composed of a blend of: (a) 82 weight percent LLDPE #1, (b) 15 weight percent EVA #1, and (c) 3 weight percent Antiblock #1. In Film No. 4, the B Layer is composed of 100 weight percent EVA #2. Furthermore, as with Film No. 1, in Film No. 4 the A Layer makes up 85 percent of the tape thickness, and a B layer makes up 15 percent of the tape thickness.

Film No. 5

Film No. 5 is prepared by the same process employed to produce Film No. 1, except that in Film No. 5, the A Layer is composed of a blend of: (a) 67 weight percent LLDPE #1; (b) 30 weight percent XU59220.01, a proprietary experimental long chain branched homogeneous ethylene/alpha-olefin copolymer (hereinafter referred to as "homogeneous ethylene/alpha-olefin #3") having a density of 0.901 g/cc and a malt index of 0.9, obtained under a development agreement with The Dow Chemical Company of Midland, Mich.; and, (c) 3 weight percent Antiblock # 1. The information concerning XU59220.01 and the evaluation results of film/bag containing the experimental polymer which are set forth in this example have been approved for release by Dow. In Film No. 5, the B Layer is composed of 100 weight percent EVA #2. Furthermore, as with Film No. 1, in Film No. 5 the A Layer makes up 85 percent of the tape thickness, and a B layer made up 15 percent of the tape thickness.

Film No. 6

A coextruded, two-ply, tubular tape is cast, the tape having a thickness of 9 mils, the tape having an A layer making up 85 percent of the tape thickness, and a B layer making up 15 percent of the tape thickness. The A Layer is composed of a blend of: (a) 50 weight percent of a resin composition referred to as ECD 103 linear homogeneous ethylene/hexene copolymer, also obtained from the Exxon Chemical Company (hereinafter referred to as "linear homogeneous ethylene/alpha-olefin #4"), (b) 37 weight percent ECD 106 linear homogeneous ethylene/hexene copolymer, having a density of about 0.917 g/cc, and a melt index of about 3, also obtained from the Exxon Chemical Co. (hereinafter referred to as "linear homogeneous ethylene/alpha-olefin #5"), (c) 10 weight percent LD 200.48 (TM) low density polyethylene having a density of 0.917 g/cc and a melt index of 6.7, this low density polyethylene also obtained from the Exxon Chemical Co., and (d) 3 weight percent Antiblock #1. In Film No. 6, the B Layer is composed of 100 weight percent EVA #2.

The two-ply sheet is cooled to a solid phase using a chilled roll, and is then electronically crosslinked with a 500 Kev beam to a level of approximately 2 to 10 MR. The resulting crosslinked two-ply sheet is heated with hot air (at 210–220° F.), and is subsequently oriented by drawing and stretching approximately 300 percent in each of the machine and transverse directions, respectively, using a tenter frame, to produce a biaxially oriented film having a thickness of about 1 mil.

Film No. 7

A coextruded, two-ply sheet is cast, the sheet having a thickness of 18 mils, the sheet having an A layer making up 85 percent of the sheet thickness, and a B layer making up 15 percent of the sheet thickness. The A Layer is composed of a blend of: (a) 97 weight percent linear homogeneous ethylene/alpha-olefin #4, and (b) 3 weight percent Antiblock #1. In Film No. 7, the B Layer is composed of 100 weight percent EVA #2.

The two-ply sheet is cooled to a solid phase using a chilled roll, and then electronically crosslinked with a 500 Kev beam to a level of approximately 2 to 10 MR. The resulting crosslinked two-ply sheet is heated with hot air (at 210–220° F.), and is subsequently oriented by drawing and stretching approximately 300 percent in each of the machine and transverse directions, respectively, using a tenter frame, to produce a biaxially-oriented film having a thickness of about 2 mils.

Film No. 8

A single ply sheet is cast, the sheet having a thickness of 18 mils, the sheet being composed of a blend of: (a) 97 weight percent linear homogeneous ethylene/alpha-olefin #4, and (b) 3 weight percent Antiblock #1. After the sheet is cast, the tape is cooled to a solid phase using a chilled roll, and then electronically crosslinked with a 500 Kev beam to a level of approximately 2 to 10 MR. The resulting crosslinked two-ply sheet is heated with hot air (at 210–220° F.), and is subsequently oriented, using a tenter frame, to impart longitudinal orientation in an amount of about 300 percent, and transverse orientation in an amount of about 300 percent, to result in a biaxially oriented film having a thickness of about 2 mils.

Film No. 9

A single ply tubular tape is cast, the tape having a thickness of 27 mls, the tape being composed of a blend of: (a) 97 weight percent linear homogeneous ethylene/alpha-olefin #4, and (b) 3 weight percent Antiblock #1. After the tape is cast, the tape is cooled to a solid phase using chilled air or chilled water, and then electronically crosslinked with a 500 Kev beam to a level of approximately 2 to 10 MR. The resulting crosslinked tape is then heated with hot air (at 210–220° F.), and is subsequently oriented by drawing and stretching approximately 320 percent in each of the machine and transverse directions, respectively, using a trapped bubble process, to produce a biaxially-oriented film having a thickness of about 2.8 mils. The tubular film is thereafter slit to form a flat film.

Film No. 10

Film No. 10 is prepared by the same process employed to produce Film No. 6, except that in Film No. 10, the A Layer is composed of a blend of: (a) 67 weight percent LLDPE #1 (b) 30 weight percent ENGAGE EG 8100 (TM) long chain branched homogeneous ethylene/alpha-olefin copolymer, also obtainable from The Dow Chemical Company (hereinafter referred to as "homogeneous ethylene/alpha-olefin #6"), and (c) 3 weight percent Antiblock #1. In Film No. 10, the B Layer is composed of 100 weight percent EVA #2. Furthermore, as with Film No. 6, in Film No. 10 the A Layer makes up 85 percent of the tape thickness, and a B layer makes up 15 percent of the tape thickness.

Film No. 11

Film No. 11 is prepared by the same process employed to produce Film No. 6, except that in Film No. 11, the A Layer is composed of a blend of: (a) 67 weight percent LLDPE #1, (b) 30 weight percent ENGAGE EG 8150 (TM) long chain branched homogeneous ethylene/alpha-olefin copolymer, also obtainable from The Dow Chemical Company (hereinafter referred to as "homogeneous ethylene/alpha-olefin #7"), and (c) 3 weight percent Antiblock #1. In Film No. 11, the B Layer is composed of 100 weight percent EVA #2. Furthermore, as with Film No. 6, in Film No. 11 the A Layer makes up 85 percent of the tape thickness, and a B layer makes up 15 percent of the tape thickness.

Film No. 12

Film No. 12 is prepared by the same process employed to produce Film No. 6, except that in Film No. 12, the A Layer is composed of a blend of: (a) 50 weight percent of a resin referred to as SLP 9042 linear homogeneous ethylene/alpha-olefin copolymer, obtainable from the Exxon Chemical Company (hereinafter referred to as "linear homogeneous ethylene/alpha olefin #8"), (b) 47 weight percent LLDPE #1, and (c) 3 weight percent Antiblock #1. In Film No. 12, the B Layer is composed of 100 weight percent EVA #2. Furthermore, as with Film No. 6, in Film No. 12 the A Layer makes up 85 percent of the tape thickness, and a B layer makes up 15 percent of the tape thickness.

Film No. 13

Film No. 13 is prepared by the same process employed to produce Film No. 6, except Film No. 13 is a three-ply tubular film in which the A Layer made up 35 percent of the thickness of the film, the B Layer made up 50 percent of the thickness of the film, and the C Layer made up 15 percent of the thickness of the film. The A Layer is composed of a blend of: (a) 94 weight percent AFFINITY HF 1031 (TM) long chain branched homogeneous ethylene/alpha-olefin also obtained from The Dow Chemical Company (hereinafter referred to as "long chain branched homogeneous ethylene/alpha-olefin copolymer #9"), and (b) 6 percent Antiblock #1. The B Layer is composed of 100 percent AFFINITY 1570 (TM) long chain branched homogeneous ethylene/alpha-olefin copolymer, obtainable from The Dow Chemical Company (hereinafter, "ethylene/alpha-olefin #10"). The C Layer is composed of 100 weight percent EVA #2.

Film No. 14

Film No. 14 is a three-ply film prepared by the same process employed to produce Film No. 13, except that in Film No. 14, the A Layer is composed of a blend of: (a) 67 weight percent LLDPE #1, (b) 30 weight percent homogeneous ethylene/alpha-olefin #7, and (c) 3 percent Antiblock #1. The B Layer is composed of 100 percent homogeneous ethylene/alpha olefin #7, and the C Layer is composed of 100 weight percent EVA #2.

Film No. 15

Film No. 15 is a two-ply film prepared by the same process employed to produce Film No. 6, except that in Film No. 15, the A Layer is composed of a blend of: (a) 87 weight percent LLDPE #1, (b) 10 weight percent EVA #1, and (c) 3 percent Antiblock #1. The B Layer is composed of 100 weight percent EVA #2.

Film No. 16

Film No. 16 was prepared by a process similar to the process employed in the production of Film No. 1. Film No. 16 was made by coextruding a tubular film which has an A/B/C structure in the thickness ratio of 15/70/15, respectively. The A Layer was an outside layer composed of: (a) 87 weight percent LLDPE #1; (b) 10 weight percent EVA #1; and (c) 3 weight percent Antiblock #1. The B Layer was a core layer composed of (a) 97 weight percent homogeneous ethylene/alpha-olefin copolymer #10: and, (b) 3 weight percent Antiblock #1. The C Layer was an inside layer composed of 100 weight percent EVA #2.

The coextruded, three-ply tubular tape was cast, the tape having a thickness of 20 mils. The two-ply tubing was cooled to a solid phase in a water bath and was then is electronically crosslinked with a 500 Kev beam to a level of approximately 12 MR.

The resulting crosslinked two-ply tubing was heated by immersion in a hot water bath having a temperature of about 210° F., and was subsequently oriented by being drawn and stretched approximately 370%, in each of the machine and transverse directions, respectively, using a trapped bubble of air held between two nip rolls, resulting in a three-ply film having a thickness of about 1.46 mils, in the form of a tube.

After drawing, the resulting tube of hot-water-shrinkable flat film was passed through a pair of nip rolls, causing the inside C layer to bond to itself upon tube collapse, rendering a final six-ply film having a thickness of about 2.9 mils. Film No. 16 was determined to have a free shrink at 185° F. (determined using ASTM 2732) of about 48 percent, and the instrumented impact of Film No. 16 (determined using ASTM D 3763), was determined to be about 110 pounds.

Film No. 17

Film No. 17 is prepared by a process similar to the process employed in the production of Film No. 16. Film No. 17 is made by coextruding a tubular film which had an A/B/C structure in the thickness ratio of 35/50/15, respectively. The A Layer is an outside layer composed of: (a) 87 weight percent LLDPE #1; (b) 10 weight percent EVA #1; and (c) 3 weight percent Antiblock #1. The B Layer was a core layer composed of (a) 97 weight percent long chain branched homogeneous ethylene/alpha-olefin copolymer #3; and, (b) 3 weight percent Antiblock #1. The C Layer is an inside layer composed of 100 weight percent EVA #2. The coextruded, three-ply tubular tape is cast, the tape having a thickness of 17.5 mils. The two-ply tubing is cooled to a solid phase in a water bath and then electronically crosslinked with a 500 Kev beam to a level of from about 2 to 10 MR.

The resulting crosslinked two-ply tubing is heated by immersion in a hot water bath having a temperature of about 208° F., and is subsequently oriented by being drawn approximately 340% in the machine direction and stretched approximately 370%, in the transverse direction, using a trapped bubble of air held between two nip rolls, resulting in a three-ply film having a thickness of 1.4 mils, in the form of a tube.

After drawing, the resulting tube of hot-water-shrinkable flat film is passed through a pair of nip rolls, causing the inside C layer to bond to itself upon tube collapse, rendering a final six-ply film having a thickness of about 2.8 mils.

Film No. 18

Film No. 18 is prepared by a process similar to the process employed in the production of Film Nos. 16 and 17. Film No. 18 is made by coextruding a tubular film which had an A/B/C structure in the thickness ratio of 15/70/15, respectively. The A Layer is an outside layer composed of: (a) 87 weight percent LLDPE #1; (b) 10 weight percent EVA #1 and (c) 3 weight percent Antiblock # 1. The B Layer is identical, in chemical composition, to the A Layer. The C Layer is an inside layer composed of 100 weight percent EVA #2. The coextruded, three-ply tubular tape is cast, the tape having a thickness of 18 mils. The two-ply tubing is cooled to a solid phase in a water bath and is then electronically crosslinked with a 500 Kev beam to a level of from about 2 to 10 MR.

The resulting crosslinked two-ply tubing is heated by immersion in a hot water bath having a temperature of about 210° F., and is subsequently oriented by being drawn approximately 360% in the machine direction and stretched approximately 370%, in the transverse direction, using a trapped bubble of air held between two nip rolls, resulting in a three-ply film having a thickness of about 1.35 mils, in the form of a tube.

After drawing, the resulting tube of hot-water-shrinkable flat film is passed through a pair of nip rolls, causing the inside C layer to bond to itself upon tube collapse, rendering a final six-ply film having a thickness of about 2.7 mils.

Film No. 19

An extrusion coated seven-layer tubular tape is cast, the tape having a thickness of 18.6 mils. The three-ply tubing is cooled to a solid phase in a water bath and then electronically crosslinked with a 500 Kev beam to a level of from about 2 to 10 MR. The resulting crosslinked three-ply tubing is extrusion coated with four additional polymer layers extruded through an annular die, in a process as illustrated in FIG. 6. The resulting 26.5 mil extrusion-coated tape is thereafter immersed in a hot water bath have a temperature of about 192° F., and is subsequently oriented by being drawn approximately 300% in the machine direction, and stretched approximately 325% in the transverse direction, using a trapped bubble of air held between two nip rolls. The orientation results in a 2.7 mil film in the form of a tube. FIG. 3C is a schematic cross-sectional view of Film No. 19. Table V, below, includes the chemical composition and thickness of each of the layers, together with the function which the layer serves in the film.

TABLE V

| layer designation | layer location / function | chemical composition of layer | layer thickness (mils) |
| --- | --- | --- | --- |
| 202 | Inside / seal | 90% EVA #3 10% LLDPE #1 | 0.36 |
| 204 | Inner / bulk | LLDPE #1 | 1.39 |
| 206 | Inner / tie | 100% EVA #4 | 0.15 |
| 208 | inner / O$_2$-barrier | PVDC Blend #1 | 0.18 |
| 210 | Inner / tie | 100% EVA #4 | 0.15 |
| 212 | Inner / bulk | LLDPE #1 | 0.30 |
| 214 | Outside / abuse | 92.5% EVA #5 7.5% LLDPE #1 | 0.17 |

EVE #3 is PE 3507-2 (TM) ethylene/vinyl acetate copolymer having a vinyl acetate content of 6.2%, a met index of 2.5, and a density of 0.93 g/cc, obtainable from DuPont. EVA #4 is EP 4062-2 (TM) ethylene/vinyl acetate copolymer having a vinyl acetate content of 15%, a melt index of 2.5, and a density of 0.938 g/cc., also obtainable from DuPont. EVA #5 is LD-318.92 (TM) ethylene/vinyl acetate copolymer having a vinyl acetate content of 9%, a melt index of 2.0, and a density of 0.93 g/cc, obtainable from Exxon. PVDC Blend #1 is a composition comprising: (a) about 96 weight percent DOW MA134 (TM) vinylidene chloride/methyl acrylate copolymer having a methyl acrylate content of 8.5%, obtainable from The Dow Chemical Company, of Midland, Mich.; (b) about 2 weight percent PLAS CHEK 775 (TM) epoxidized soybean oil, obtainable from Ferro Chemicals, of Bedford, Ohio; and, (c) about 2 weight percent METABLEN L1000 (TM) acrylate blend, obtained from Elf Atochem, of Philadelphia, Penn. METABLEN L1000 (TM) comprises about 53 weight methyl methacrylate ("MMA"), 29 weight percent butyl methacrylate ("BMA"), and 19 weight percent butyl acrylate ("BA"). The tubing of Film No. 19 is opened up to provide for a 2.7 mil flat film, which can be converted into side seal bags.

Film No. 20

Film No. 20 was prepared by a process otherwise similar to the process employed to produce Film No. 3, except that in Film No. 20, except that the A Layer was composed of a blend of: (a) 95.5 weight percent LLDPE #1, (b) 4.5 weight percent of an antiblock masterbatch similar to Antiblock #1, sold as TEKNOR 10183ACP (TM) antiblock agent, obtained from Teknor Apex Plastics Division of Pawtucket, R.I.: and, the B layer was composed of 100 weight percent ESCORENE® LD-761.36 (TM) ethylene/vinyl acetate copolymer having a vinyl acetate content of 28 percent and a density of 0.950 g/cc, and a melt index of 5.7, obtained from the Exxon Chemical Company, of Houston, Tex. Furthermore, as with Film No. 3, in Film No. 20 the A Layer made up 85 percent of the tape thickness, and a B layer made up 15 percent of the tape thickness.

In the article according to the present invention, preferably the film stock from which the bag is formed is a multilayer film having from 3 to 7 layers; more preferably, 4 layers.

The polymer components used to fabricate films useful in articles according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The films used to make the article of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment. which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is applied to the film. Preferably, irradiation is carried out by an electron accelerator and the dosage level is determined by standard dosimetry methods. Other accelerators such as a Vander Graff or resonating transformer may be used. The radiation is not limited to electrons from an accelerator since any ionizing radiation may be used. The ionizing radiation crosslinks the polymers in the film. Preferably, the film is irradiated at a level of from 2–15 MR, more preferably 2–10 MR. As can be seen from the descriptions of preferred films for use in the present invention, the most preferred amount of radiation is dependent upon the film and its end use.

The corona treatment of a film is performed by subjecting the surfaces of the film to corona discharge, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. Although corona treatment is a preferred treatment of the multilayer films used to make the bag of the present invention, plasma treatment of the film may also be used.

In general, sealing of film to produce a bag can be performed using a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser. The preferred sealing means is an impulse sealer. Films which are predominantly polyethylene are generally sealed using impulse sealing or hot bar sealing. Both linear and shaped seats can be formed, as is known to those of skill in the art. In general, sealing and cutting of tubing to produce bags is disclosed in U.S. Pat. Nos. 3,552,090, 3,383,746, and U.S. Ser. No. 844,883, filed Jul. 25, 1969, to OWEN, each of these two U.S. Patents as well as the U.S. Patent application, hereby being incorporated by reference thereto, in their entireties.

The article of the present invention is useful in a wide variety of packaging applications in a wide variety of areas, such as agricultural, industrial non-food, industrial overwrap film, medical, retail consumer, food packaging, home, industrial, and construction, among other uses. More particularly, the article of the present invention can be used for the packaging of: tools and hardware (both civilian and military), machinery parts, appliances, marine hardware (e.g., anchors, props, etc.) corrosive metal products, industrial parts containing rust inhibitor, powdered chemicals and concentrates (especially photographic chemicals in bulk form), industrial cartridge packs, brick (especially refractory brick), toys, bearings, dry pet food, articles currently packaged in buckets, especially heavy 5-gallon-type buckets, precut unassembled wood products, products currently packaged in woven sacks, products requiring a package which is a substantial barrier to atmospheric oxygen, coffee, hops, shrimp, peanuts, raisins, parcels being mailed, retortable pouches, viscous fluids, explosives, frozen products, ballistic cargo, textile products (apparel and home furnishings), furniture, products dangerous for children (i.e., child-resistant flexible packaging), fertilizer and grain (especially for overseas shipment), plants (especially potted plants), insecticides and other poisonous and hazardous chemicals, insect repellent, for sand bagging for flood control, water, seeds, skis, antiques and works of art, firewood, lumber, tires, paper and plastic film and sheet goods (especially photographic paper and photographic film, especially in 10–100 pound rolls, especially where the multilayer packaging film has a layer of embedded carbon black, i.e., blended with polymer, to prevent the paper and/or film from being exposed to light), hemmocult specimens, child-proof pouches, and packages comprising a plurality of articles (i.e., multipaks).

In addition, the article according to the present invention can be used in the packaging of fresh meat products comprising bone. Among the meat products which can be packaged in the articles according to the present invention are poultry, pork, beef, lamb, goat, horse, and fish. More specifically, preferred meat products to be packaged in the article of the present invention include ham, spareribs, picnic, back rib, short loin, short rib, whole turkey, and pork loin. The article of the present invention is especially useful for the packaging of a pair of bone-in whole pork loins.

Moreover, the article of the present invention is also useful as a: liner for landfills, pools, etc., in compression packaging, as a tarp for boats (especially shrinkable), etc., marine personal safety device, as tags/labels, in the protection of mobile homes (especially shrinkable), for landscaping end use (especially as a plastic grid system), in temporary shelter, tents, greenhouse covers, as a shrinkable overwrap, in upholstery webbing, as a vacuum-press bag, such as for a vacuum-bag veneer press, as a slit fence, as an automotive substrate, in paving and roofing applications, in handles for bags, etc., as a beverage carrier, as an oil spill containment film, in rain apparel, as a dispenser (e.g., for adhesives such as epoxy, etc.), as a horizontal silo, as a solar panel cover, to be combined with a corrugated material, for pallet banding, in anti-pilfering packaging, in luggage, duffel bags, etc, in industrial vacuum packaging, as a non-sticking shrink bag, as a shrinkable mattress cover, as a dust cover (especially for cars), as an evidence bag, as a dry bag, as a shrinkable film for tray packs (especially cans), in industrial skin packaging material, as a rubber sheet curing wrap-release sheet, as a ground cloth (for painting, tents, etc.), as a reusable envelope or pouch for photographic plates, film, etc., as a replacement for corrugated packaging materials, as a recreational device for sliding on ice, snow, etc., as a rollstock ovenwrap (for aluminum beverage cans, paper, etc.), as medical intravenous bags, as a shrinkable balloon, in shrink bags for packaging and storage (especially for heavy items such as books, dishes, etc.), for use in a descent, travel, and protection apparatus as disclosed in U.S. Pat. No. 5,568,902, to Hurley, Jr., as a childproof wrap, a childproof pouch, for air bags, in a wide variety of medical applications, as banding material (e.g., for spiral wrap, inground pipes, for tight shrink, etc.), for use as a tape (if coated with adhesive), for compression devices (tourniquets, splints, etc.), as a reinforcing material (e.g., for concrete, fiberglass, etc.), as a cable component, as a ( straightjacket,) as a euthanasia chamber, in handcuffs and other restraint and fastening devices, as a body bag, in tanks (e.g., fuel tanks, solvent tanks, etc.), in pipes, as an ostomy or colostomy pouch or bag, pouch, as a kite, in water slides, in an archery target, as an emergency chute for aircraft, in a chute for hill traversing, in fabrics (especially slit, woven), in ropes for high tensile applications, as a component in road construction, as a construction underlay, in mailboxes, as a carpet underlay, as a masking material, as a conveyor belt or sheet, and in a bandoleer.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. An article comprising a non-crosslamiated film with a thickness of from about 1 to 2.9: mils, the non-crosslaminated film consisting essentially of at least one member selected from the group consisting of linear low density polyethylene, high density polyethylene, homogeneous ethylene/alpha-olefin copolymer, polyester homopolymer, ethylene/acid copolymer, ethylene/ester copolymer, ionomer, ethylene/carbon monoxide copolymer, very low density polyethylene, low density polyethylene, polypropylene homopolymer, ethylene/propylene/diene terpolymer, ethylene/norbornene copolymer, styrene homopolymer, and ethylene/styrene copolymer; and the non-crosslaminated film is bonded to itself or a second component with a thickness of from about 1 to 2.9 mils, the second component comprising at least one member selected from the group consisting of linear low density polyethylene, high density polyethylene, homogeneous ethylene/alpha-olefin copolymer, polyester homopolymer, ethylene/acid copolymer, ethylene/ester copolymer, ionomer, ethylene/carbon monoxide copolymer, very low density polyethylene, low density polyethylene, polypropylene homopolymer, ethylene/propylene/diene terpolymer, ethylene/norbornene copolymer, styrene homopolymer, and ethylene/styrene copolymer; and wherein the article has a parallel plate burst strength of at least 275 inches of water.

2. The article according to claim 1, wherein the non-crosslaminated film is bonded to itself.

3. The article according to claim 1, wherein the film has a total thickness of from about 1.2 to 2.9 mils, and the article has a parallel plate burst strength of from about 275 to 500 inches of water.

4. The article according to claim 3, wherein the film is a monolayer film.

5. The article according to claim 3, wherein the film is a multilayer film comprising:
   (A) a first inner layer and a second inner layer, wherein each of the inner layers comprises at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and
   (B) a first outer layer and a second outer layer, wherein each of the outer layers comprises (a) at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer, as well as (b) at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and
   wherein at least one member selected from the group consisting of the first outer layer and the second outer layer is sealed to itself or the other outer layer.

6. The article according to claim 5, wherein the multilayer film has a total thickness of from about 2.3 to 2.7 mils, and wherein the article has a parallel plate burst strength of from about 300 to 500 inches of water.

7. The article according to claim 5, wherein the multilayer film is heat-shrinkable.

8. The article according to claim 7, wherein the multilayer film is biaxially oriented and has a free shrink, at 185° F., of from about 10 to 100 percent.

9. The article according to claim 5, wherein the multilayer film further comprises an $O_2$-barrier layer comprising at least one member selected from the group consisting of ethylene/vinyl alcohol copolymer, polyvinyl chloride, polyvinylidene chloride, polyamide, polyester, polyacrylonitrile.

10. The article according to claim 1, wherein the film is irradiated to a level of from about 50 to 150 kiloGrays.

11. The article according to claim 1, wherein the article comprises at least one member selected from the group consisting of end-seal bag, side-seal bag, L-seal bag, pouch, and backseamed casing.

12. An article comprising a first multilayer film sealed to a second multilayer film, wherein:
   (A) the first multilayer film consists essentially of at least one member selected from the group consisting of linear low density polyethylene, high density polyethylene, low density polyethylene, very low density polyethylene, homogeneous ethylene/alpha-olefin copolymer, polypropylene homopolymer, ethylene/acid copolymer, ethylene/ester copolymer, ester homopolymer, ionomer, ethylene/carbon monoxide copolymer, ethylene/propylene/diene terpolymer, ethylene/norbornene copolymer, styrene homopolymer, and ethylene/styrene copolymer; and
   (B) the second multilayer film comprises at least one member selected from the group consisting of linear low density polyethylene, high density polyethylene, low density polyethylene, very low density polyethylene, homogeneous ethylene/alpha-olefin copolymer, polypropylene homopolymer, ethylene/acid copolymer, ethylene/ester copolymer, ester homopolymer, ionomer, ethylene/carbon monoxide copolymer, ethylene/propylene/diene terpolymer, ethylene/norbornene copolymer, styrene homopolymer and ethylene/styrene copolymer; and
   wherein the first multilayer film is not a cross-laminated film and the second multilayer film is not a cross-laminated film, and the first multilayer film has a thickness of from about 1 to 2.9 mils and the second multilayer film has a thickness of from about 1 to 2.9 mils, and wherein the article has a parallel plate burst strength of at least about 275 inches of water, and the article is made by sealing the first multilayer film to the second multilayer film.

13. The article according to claim 12, wherein:
   (A) the first multilayer film comprises two outer layers each of which comprises linear low density polyethylene, and two inner layers each of which comprises ethylene/vinyl acetate copolymer;
   (B) the second multilayer film comprises two outer layers each of which comprises linear low density polyethylene, and two inner layers each of which comprises ethylene/vinyl acetate copolymer.

14. The article according to claim 12, wherein the first multilayer film has a total thickness of from about 2.3 to 2.7 mils, the second multilayer film has a total thickness of from about 2.3 to 2.7 mils, and the article has a parallel plate burst strength of from about 300 to 500 inches of water.

15. The article according to claim 14, wherein the first multilayer film and the second multilayer film are identical with respect to chemical composition and thickness.

16. The article according to claim 12, wherein the article comprises at least one member selected from the group consisting of a pouch and a butt-sealed backseamed casing having a butt-seal tape.

17. The article according to claim 12, wherein:
   the first multilayer film further comprises an $O_2$-barrier layer comprising at least one member selected from the group consisting of ethylene/vinyl alcohol copolymer, polyvinyl chloride, polyvinylidene chloride, polyamide, polyester, and polyacrylonitrile; and
   the second multilayer film further comprises an $O_2$-barrier layer comprising at least one member selected from the group consisting of ethylene/vinyl alcohol copolymer, polyvinyl chloride, polyvinylidene chloride, polyamide, polyester, and polyacrylonitrile.

18. The article according to claim 12, wherein the multilayer film is heat-shrinkable.

19. The article according to claim 12, wherein the multilayer film is biaxially oriented and has a free shrink, at 185° F., of from about 10 to 100 percent.

20. The article according to claim 12, wherein the film is irradiated to a level of from about 50 to 150 kiloGrays.

21. A packaged product comprising a package and a product surrounded by the package, wherein:
   (A) the package comprises a non-crosslaminated film with a thickness of from about 1 to 2.9 mils, the non-crosslaminated film consisting essentially of at least one member selected from the group consisting of linear low density polyethylene, high density polyethylene, homogeneous ethylene/alpha-olefin copolymer, polyester homopolymer, ethylene/acid copolymer, ethylene/ester copolymer, ionomer, ethylene/carbon monoxide copolymer, very low density polyethylene, low density polyethylene, polypropylene homopolymer, ethylene/norbornene copolymer, styrene homopolymer, and ethylene/styrene copolymer, and the non-crosslaminated film is sealed to itself or a second film with a thickness of from about 1 to 2.9 mils, the second film comprising at least one member selected from the group consisting of linear low density polyethylene, high density polyethylene, homogeneous ethylene/alpha-olefin copolymer, polyester homopolymer, ethylene/acid copolymer, ethylene/ester copolymer, ionomer, ethylene/carbon monoxide copolymer, very low density polyethylene, low density polyethylene, polypropylene homopolymer, ethylene/propylene/diene terpolymer, ethylene/norbornene copolymer, styrene homopolymer, and ethylene/styrene copolymer, wherein the article has a parallel plate burst strength of at least 275 inches; and (B) wherein the product comprises at least one member selected from the group consisting of compact disks, records, audio cassettes, video cassettes, tool, hardware, machinery parts, appliances, marine hardware, corrodible metal products, industrial parts containing rust inhibitor, aerosol spray can, wax, powdered chemicals, liquid chemical concentrate, industrial cartridge packs, toys, bearings, drywall, concrete board, bricks, dry pet food, adhesive, caulk, plaster mix, precut unassembled wood products, coffee, hops, shrimp, peanuts, retortable pouches, viscous fluids, explosives, frozen products, ballistic cargo, textile products, furniture, cars, boats, products dangerous for children, fertilizer and grain, plants, insecticide, sand bags, water, seeds, skis, works of art, unmilled wood, lumber, tires, and hemmocult specimens.

22. The packaged product according to claim 21, wherein a plurality of products are in the package.

23. The packaged product according to claim 21, further comprising a secondary packaging component between the film and the product, wherein the secondary packaging component comprises at least one member selected from the group consisting of rigid foam, flexible foam, film bubble product, and paper.

24. The packaged product according to claim 23, wherein the secondary packaging component comprises foam.

25. The article according to claim 1, wherein the article has a parallel plate burst strength of from at least 280 to 500 inches of water.

26. The article according to claim 1, wherein the article has a parallel plate burst strength of from at least 290 to 500 inches of water.

27. The article according to claim 1, wherein the article has a parallel plate burst strength of from at least 300 to 500 inches of water.

* * * * *